Feb. 18, 1969  R. S. HECKROTTE ET AL  3,428,289
MOLDING APPARATUS
Filed Sept. 1, 1966
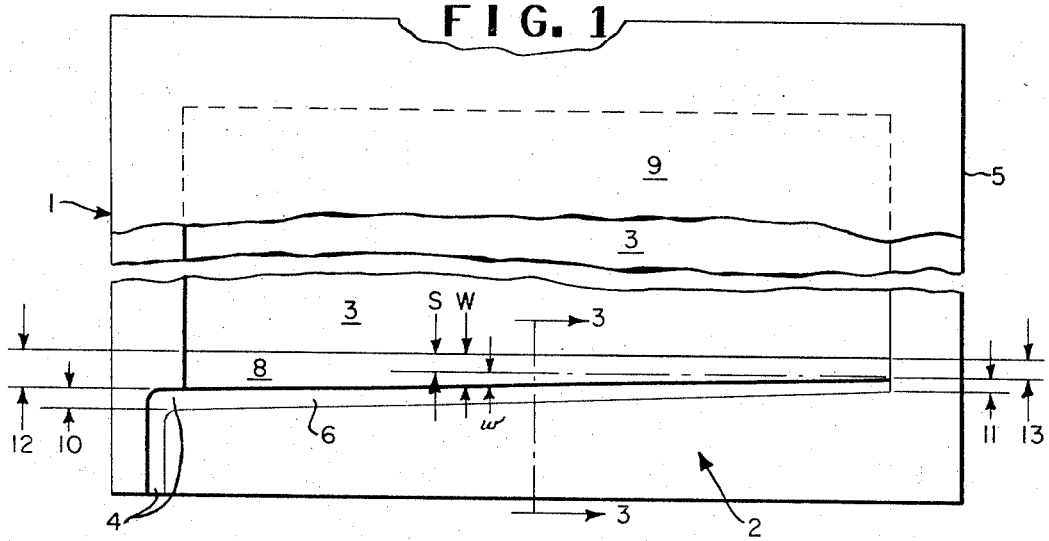
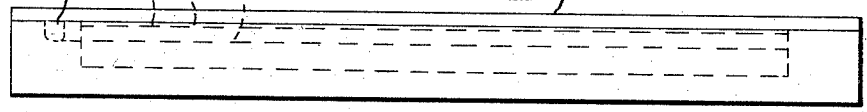
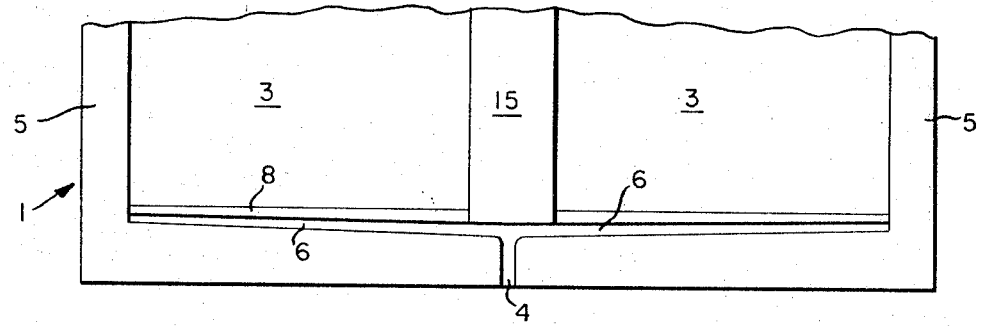
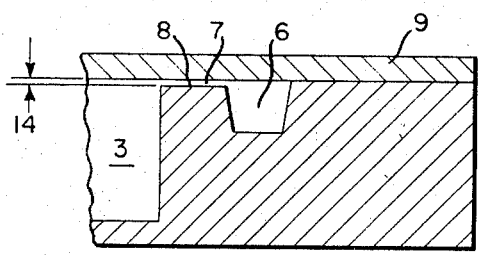
INVENTORS
ROBERT S. HECKROTTE
EDWARD F. LEWIS
ELWOOD A. SINSON
BY *James J. Flynn*
ATTORNEY

3,428,289
MOLDING APPARATUS
Robert S. Heckrotte and Edward F. Lewis, Wilmington, Del., and Elwood A. Sinson, Woodbury, N.J., assignors to E. I. du Pont de Nemours and Company, Wilmington, Del., a corporation of Delaware
Filed Sept. 1, 1966, Ser. No. 576,593
U.S. Cl. 249—105          8 Claims
Int. Cl. B22d 35/04; B29c 3/04

This invention relates to a novel apparatus for molding materials, especially thermosetting materials, and particularly to relatively low viscosity materials such as fluid monomers and a process for molding such materials.

In the art of producing shaped objects many techniques have been employed and such techniques are governed by the properties of the material being processed. The molding of, for example, thermosetting resins, i.e., resins which solidify by chemical reaction which occurs in a heated mold, by their injection in a plastic state into a hot mold is called transfer molding. Transfer molding comprises the steps of plasticizing or fusing a resin by contact with a heated surface of a pressure chamber, passing the material through a narrow passage where further heating can take place, transferring this material in a flowable condition to a closed mold, filling the cavity at relatively high pressure which is maintained on the material in the mold while heating it to set the formed plastic material, and finally removing the finished article from the mold cavity together with the waste, thus preparing the equipment for another molding cycle. Thermoset resins which are used in transfer molding include, for example, phenolics, aminos, reinforced esters, epoxies, diallyl phthalates, and silicones. In general, the flowability of these compositions is poor, careful control of flow of materials is required to avoid excessive precuring of the heated resin and the flow of material into the mold generally is not uniform along the entrance of the mold cavity. Development in recent years of knowledge concerning anionic catalyzed and promoted, or cocatalyzed, polymerization of lactams provided a greatly extended range for employment of the general techniques of transfer molding. The relatively low viscosity of promoted and catalyzed lactam compositions has the beneficial effect of facilitating their flow into molds, the use of relatively low transfer pressures and less massive molds, and the commercial production of massive or intricately shaped polylactam cast products by transfer molding of such compositions. However, the fluidity and easy flowability of promoted catalyzed lactam compositions creates a rather unique and serious problem in charging molds in transfer molding. In transferring the promoted catalyzed lactam compositions into molds, the rapid flow of the lactam composition into the conventional molds under normal operating conditions is turbulent. The turbulence causes entrapment of air from the mold space into the lactam composition and also causes a variable degree of polymerization of the lactam composition. The entrapment of such air bubbles and variations in degree of polymerization deleteriously affect the density and strength of the molded objects. The present invention provides an apparatus and process that overcomes the problems mentioned above, eliminates jetting of the casting fluid into the mold cavity, provides for a uniform flow distribution into the mold cavity resulting in, among other things, a more uniform density and degree of polymerization in the molded object and is particularly useful for molding objects of large planar area. Other objects of the invention will become apparent hereinafter.

In the accompanying drawing:

FIGURE 1 is a plan view of a two-part mold constructed in accordance with this invention;

FIGURE 2 is an end view of the mold apparatus of FIGURE 1;

FIGURE 3 is a transverse cross sectional view of the apparatus along line 3—3 of FIGURE 1; and FIGURE 4 is a plan view of a modified form of the apparatus illustrating a double cavity mold and fluid distribution means of the apparatus.

It has been discovered that a predetermined controlled flow distribution of casting fluid into a mold cavity can be accomplished by means of the present invention wherein the apparatus comprises a mold having at least two parts adapted to be held together along a parting line to form a mold cavity, fluid distributor means located on said parting line adjacent the mold cavity adapted to feed fluid casting material into the mold cavity, said distributor means comprising a header substantially parallel to said mold cavity and between said header and mold cavity and in abutting relationship thereto a gate, i.e., a passage, having a land width to provide a controlled flow of said casting fluid out of said header, said gate running from said header to said mold cavity along substantially the entire length of said mold cavity adjacent said land and means for introducing casting fluid into said header. In order to ascertain and define the particular width variation of the land, i.e. the distance from the header to the mold cavity along the surface of the land, pressure variations in the system are determined so that the variation of the land width produces a controlled velocity profile at the gate exit into the mold cavity. The land width along the header length from feed end to closed end is calculated from flow conditions, fluid properties and geometry of the header and thus the width of the gate, i.e. the land can be defined, according to the particular material being molded and the conditions under which molding is accomplished, by the following formulas expressed in consistent units:

$$W = w + S = \frac{(\Delta P_x - \Delta P_L)\rho t^3}{12\mu \dot{m}} + S$$

$$\Delta P_x - \Delta P_L = \frac{1}{A_o} \int_x^L \left( \frac{\dot{m}U}{g_c L} + \frac{\rho U^2}{2g_c} \frac{\partial A}{\partial x} - \frac{32\mu U^n A}{D_h^2} \right) dx$$

wherein P=pressure at some point along the length of the header, $A_o$=area of the header at the feed end, L=length of header, $g_c$=gravitational constant, $\rho$=density of the fluid, $\dot{m}$=mass flow rate of the fluid at the feed end, U=velocity of the fluid, A=area of the header at some point along the length, W=total width of land, S=stub width of land, x=distance along the header measured from the feed end, n=flow exponent (n=1, Newtonian flow), $D_h$=hydraulic diameter of header at some point, t=thickness of the gate, w=compensating width of land, and $\mu$=viscosity of fluid at zero shear rate.

It is desirable after ascertaining the available feed pressure to design the pressure drop in the header and land to be about one order of magnitude greater than any pressure drops arising from flow disturbances that may be present as a result of inaccuracies introduced into the system during fabrication. Toward that objective, it is noted that the land portion of the system consists of a stub width, indicated as S in FIGURE 1 and a compensating width, indicated as $w$ in FIGURE 1. The stub is a constant width portion which is chosen to be sufficiently wide to reduce the likelihood of damage to the gate during fabrication and subsequent use. Further, its width is determined so as to minimize the local flow disturbances arising from the entrance and exit effects and yet facilitate removal of the hardened sprue without excess wastage.

Applying trial and error calculations, the design pressure drop from the feed to the terminal end of the header and through the stub width portion of the land is determined. This is then followed by calculation of the pressure drop in the header at regular intervals along its length from the terminal to the feed end. Using the header pressure drop information, the compensating width is determined for the land for each point and is added to the stub width. The magnitude of the compensating width is designed to produce a pressure drop complementing the pressure drop in the header at that point. The apparatus thus admits casting fluid, not at a single point, but along substantially the entire length of gate and land, and by varying the width of the land a controlled flow of casting fluid passes into the mold cavity.

Molds of the type exemplified are most commonly, though not necessarily, mounted in a vertical position with gas venting means at the top of the mold. The mold as shown in FIGURE 1 has two major parts, namely, a cover plate 9 and a cavity block 1 that meet along a parting line, said plate covers the cavity block, i.e. the entire surface of the mold including the bottom portion that contains the distribution means in addition to the upper portion that contains the mold cavity, when the mold is in use. The mold cavity, of course, is of any predetermined design. If desired, said plate may have a cavity of suitable design complementing the mold cavity of FIGURE 1 and/or complementing parts of the distribution means. However, due to the added cost of machining the plate, it is usually flat in the area of the apparatus that incorporates the distribution means. The assembly of the cavity block and cover plate are held firmly together, for example, between platens of a hydraulic press in a conventional manner.

The invention is more fully described by reference to the accompanying drawings wherein corresponding numbers are used for like parts throughout. FIGURE 1 illustrates a molding apparatus comprising a cavity block 1 having a base 2, side walls 5 and a mold cavity 3, all in cavity block 1. Plate 9 covers the cavity block and serves to close mold cavity 3 and the distribution means in base 2. The cavity block contains suitable bolts and holes for holding the cavity block onto a platen of a press and for attaching a fluid mixer and feeder, not shown, to the cavity block. The distribution means comprises header 6 substantially parallel to said mold cavity 3 through which the mold cavity is filled. Gate 7 has a land 8 of varying width, indicated by $W$ in FIGURE 1 and is located between said header 6 and mold cavity 3 and in abutting relationship thereto. Land 8 is recessed from the face of base 2, as shown particularly in FIGURE 3, in order to provide gate 7 so that header 6 communicates with mold cavity 3 through gate 7. Header inlet depth 10 at the feed end is equal to or greater than header depth 11 at the closed end. Preferably, as shown in FIGURE 1, header 6 is tapered so that the cross sectional area at the feed end of the channel is greater than the cross sectional area of the closed end.

As illustrated in FIGURES 1 and 4, runner 4 is contiguous with header 6 but must be so positioned as not to supply fluid directly to gate 7. Runner 4 introduces casting fluid into the header in a direction substantially parallel to the longitudinal axis of said header and gate. The runner is located so that the flow of casting fluid through it does not directly impinge upon gate 7. Otherwise runner 4 may enter the mold and join header 6 from any direction. For example, the casting fluid may enter along the same line as header 6. It has been determined that when runner 4 is in direct contact with gate 7 such arrangement tends to induce jetting of casting fluid into the mold cavity.

It is desirable that the quantity of casting fluid supplied per unit length of header correspond to the unit volume of the mold being filled. In the example described hereinbelow, a uniform flow per unit length was desired to produce satisfactory results. However, where the unit volume of the mold cavity varies along the length of the gate, the land width of the gate can be regulated, as defined by the formula given hereinabove to produce a suitable flow of fluid. A consequence of this variation in land width is that the pressure drop from the header inlet end to any point on the entrance to the mold cavity is compensated by the width of the land thus insuring a desired controlled flow of casting fluid along the entire mold cavity entrance. A preferred practical minimum land width, dimension 13, is from about 0.1 to 0.6 inch and most preferably is from about 0.2 to 0.4 inch and a preferred minimum land width near the feed end of the header, dimension 12 is from about 0.3 to 1.2 inches. As shown in the drawing, for most applications the width of the land decreases substantially constantly along its longitudinal axis from said feed end of said header, and in the formula hereinabove $U$ is substantially constant in the gate. The thickness of gate 7, that is dimension 14 between the land and cover plate, can vary considerably. In general, the thickness of said gate is about from 0.010 to 0.2 inch and preferably is about from 0.020 to 0.03 inch.

FIGURE 4 illustrates a modified form of the apparatus wherein the mold cavity is divided by center piece 15 in order to form a double cavity mold. Of course, the operation of this mold is substantially the same as that described above. For example, casting material is supplied from a source, not shown, into runner 4 and impinges against center piece 15 and radially flows through header 6 and upon substantially filling said header, the casting fluid flows over variable length gate 7 and through passage 8 in, for example, a substantially uniform flow from the header into mold cavity 3.

The present invention can be used for molding various materials. It can be used to great advantage in molding thermosetting materials such as methyl methacrylate and its prepolymers, cellulose acetate solutions, and catalyzed and promoted lactams. It is uniquely suited to molding lactams to polylactams wherein polymerization takes place in the mold cavity because the lactam polymerizable compositions have a very low viscosity. It has now been discovered that polylactams can be molded by a process which comprises:

(a) Introducing a polymerizable molten lactam composition containing an anionic catalyst and a polymerization promoter into a header located substantially parallel to a mold cavity and filling said header with the lactam composition.

(b) Feeding the polymerizable composition from said header through a gate having a land of a predetermined varying width into the mold cavity thereby equalizing the flow of casting fluid into the mold cavity to obtain a predetermined controlled flow along the entrance of said mold cavity.

The polymerization process of this invention wherein the article is formed in the mold is particularly effective in producing high molecular weight polylactams from the lactams containing 3 to 12 or more carbon atoms in the lactam ring. Such lactams include pyrrolidone, caprolactam, caprylolactam and laurolactam. The polymerizable mixture is supplied to the mold cavity in the molten state. For caprolactam this is above about 69° C. and, preferably, the molten mixture entering the mold cavity is about 140° C. to 160° C.

The anionic catalyst, i.e. lactam-base salt, used in the process of the invention is prepared by the reaction of bases with a lactam. The base employed to form the anionic catalyst can be an alkali metal, an alkaline earth metal or basic derivative of one of these metals such as hydroxide, alkoxide, hydride, alkyl, aryl, amide or organic acid salt. The polymerization promoter, i.e. cocatalyst, employed is any cocatalyst that is capable of promoting the polymerization of the polylactam below its melting point. These cocatalysts can differ greatly in structure, and include various β-lactones such as 3-pentenoic acid β-lactone, various polycarbonates such as bisphenol A, organic isocyanates and triazines. The polymerization reaction is carried out above the melting point of the monomer and below the melting point of the resulting polylactam, generally, the temperature is from about 125° to 175° C. for caprolactam. Representative catalysts, co-catalysts and anionic polymerization conditions, including amounts of ingredients, that are applicable to the present invention are well known in the art and are described, for example, in U.S. Patents 3,206,418 and 3,207,713, among others.

Foamed compositions may also be formed by incorporating a blowing agent into the molten casting fluid. Any gas-generating blowing agent that decomposes or volatilizes below the polymerization reaction temperature can be used in the process of this invention. Representative preferred blowing agents are alkanes such as pentane, hexane and the allylic azides such as those described in U.S. Patent 3,236,789.

Various fillers such as calcium carbonate, carbon black, glass particles etc., may be incorporated into the lactam casting fluid that is supplied to the mold cavity to be cast into a predetermined shape.

The following example is illustrative of the invention.

A polymerizable molten composition containing 1.8 moles per mole of caprolactam of anionic catalyst sodium caprolactam, 0.4 mole per mole of caprolactam of polymerization promoter 4,4-diphenylolpropane, 0.3% by weight of foaming agent benzyl formate, about 33% by weight of calcium carbonate filler and the balance caprolactam was fed at a flow rate of about 0.0833 pound per second into mold cavity 3 through runner 4 and header 6 at about 150° C. The density of the polymerizable composition at about 150° C., the temperature at which it entered the mold, was determined to be 1.2 grams per cubic centimeter and its viscosity was 200 centipoises. The polymerizable composition flowed through gate 7, over land 8 and said composition entered the mold cavity at a substantially uniform rate along its entire length. The mold cavity was filled and the mixture polymerized therein, as indicated by a rise in temperature due to the exothermic nature of the reaction, and the shaped article was formed. The mold was opened along its parting line and the article removed. Waste material in the runner, header and gate was readily removed and the mold was ready for another casting.

The header on the mold used in this example was cut with a tapered trapezoidal cutter with a cam to control its withdrawal over the length of the header. The depth at the feed or inlet end of the header was 0.36000 inch and at the closed end 0.07600 inch. The header channel followed a path that gave a land width W, calculated as described above and illustrated below, and for which the values are as follows:

Header depth, inlet or feed end — 0.36000 inch
Header depth, closed or terminal end — 0.07600 inch
Header width, at base — 0.27500 inch
Header length — 14.0000 inches
Half the included cutter angle — 0.17400
Viscosity — 2 poises
Specific gravity — 1.2 grams per cubic centimeter
Stub width — 0.20000 inch
Flow rate — 0.08330 pound per second
Gate thickness — 0.02400 inch

| Distance along length of land from feed end to closed end $x$ (inches): | Land width W (inches) |
|---|---|
| 0 | .5442 |
| 1 | .5131 |
| 2 | .4821 |
| 3 | .4515 |
| 4 | .4212 |
| 5 | .3914 |
| 6 | .3623 |
| 7 | .3341 |
| 8 | .3069 |
| 9 | .2811 |
| 10 | .2572 |
| 11 | .2359 |
| 12 | .2180 |
| 13 | .2051 |
| 14 | .2000 |

We claim:

1. A molding apparatus comprising a mold having at least two parts adapted to be held together along a parting line to form a mold cavity, fluid distributor means located on said parting line adjacent the mold cavity adapted to feed fluid casting material into the mold cavity, said distributor means comprisng a header substantially parallel to said mold cavity and between said header and mold cavity and in abutting relationship thereto a gate having a land of varying width to provide a controlled flow of said casting fluid out of said header, said gate running from said header to said mold cavity along substantially the entire length of said mold cavity adjacent said land and means for introducing casting fluid into said header.

2. An apparatus of claim 1 wherein the width of the land decreases substantially constantly along its longitudinal axis from said feed end of said header.

3. An apparatus of claim 1 wherein said mold has means for introducing said casting fluid into said header in a direction substantially parallel to the longitudinal axis of said header and gate.

4. An apparatus of claim 1 wherein said gate width varies according to the formulas:

$$W = w + S = \frac{(\Delta P_x - \Delta P_L)\rho t^3}{12\mu \dot{m}} + S$$

$$\Delta P_x - \Delta P_L = \frac{1}{A_o}\int_x^L \left(\frac{\dot{m}U}{g_cL} + \frac{\rho U^2}{2g_c}\frac{\partial A}{\partial x} - \frac{32\mu U^n A}{D_h^2}\right) dx$$

wherein P = pressure at some point along the length of the header, $A_o$ = area of the header at the feed end, L = length of header, $g_c$ = gravitational constant, $\rho$ = density of the fluid, $m$ = mass flow rate of the fluid at the feed end, U = velocity of the fluid, A = area of the header at some point along the length, W = total width of land, S = stub width of land, $x$ = distance along the header measured from the feed end, $n$ = flow exponent ($n=1$, Newtonian flow), $D_h$ = hydraulic diameter of header at some point, $t$ = thickness of the gate, $w$ = compensating width of land, and $\mu$ = viscosity of fluid at zero shear rate.

5. An appartus of claim 4 where U is substantially constant in the gate.

6. An apparatus of claim 5 wherein said header is tapered along its horizontal axis from the feed end thereof.

7. An apparatus of claim 5 wherein the width of the gate near the feed end of the header is between about 0.3 to 1.2 inches and the width of the gate at the closed end is between about 0.1 to 0.6 inch.

8. An apparatus according to claim 5 wherein the thickness of the gate between the land and cover plate is at least about 0.010 inch.

References Cited

UNITED STATES PATENTS

| | | | |
|---|---|---|---|
| 1,940,173 | 12/1933 | Korsino | 249—107 X |
| 2,163,814 | 6/1939 | Swarovski | 249—110 X |
| 2,227,966 | 1/1941 | Emsley | 249—110 X |
| 2,516,373 | 7/1950 | Ehlert et al. | 249—110 X |
| 2,799,435 | 7/1957 | Abplanalp | 18—420 X |
| 2,878,517 | 3/1959 | Cramer | 249—107 |

J. HOWARD FLINT, JR., *Primary Examiner.*

U.S. Cl. X.R.

249—110; 18—30, 42; 264—299